United States Patent [19]

Sasagawa et al.

[11] Patent Number: 4,707,425
[45] Date of Patent: Nov. 17, 1987

[54] OPTICAL RECORDING METHOD AND MEDIA THEREFOR

[75] Inventors: Katsuyoshi Sasagawa; Kunio Nishihara, both of Yokohama; Hiroshi Ozawa, Isehara; Masao Imai, Yokohama, all of Japan

[73] Assignee: Mitsui Toatsu Chemicals, Incorporated, Japan

[21] Appl. No.: 879,827

[22] Filed: Jun. 26, 1986

Related U.S. Application Data

[63] Continuation of Ser. No. 553,066, Nov. 18, 1983, abandoned.

[51] Int. Cl.$^4$ .............................................. G03C 5/16
[52] U.S. Cl. ..................................... 430/21; 430/495; 430/945; 430/296; 430/270; 430/338; 430/966; 430/967; 430/269
[58] Field of Search ................. 430/21, 269, 270, 495, 430/338, 341, 966, 967, 296, 945; 346/125.1, 76 L

[56] References Cited

U.S. PATENT DOCUMENTS

| | | | |
|---|---|---|---|
| 4,219,826 | 8/1980 | Bloom et al. | 430/945 |
| 4,298,975 | 11/1981 | van der Veen et al. | 430/945 |
| 4,312,936 | 1/1982 | Engler et al. | 430/339 |
| 4,465,767 | 8/1984 | Oba et al. | 430/945 |

*Primary Examiner*—Won H. Louie
*Attorney, Agent, or Firm*—McGlew and Tuttle

[57] ABSTRACT

An optical recording method which comprises providing a recording layer containing a recording susbstance that has an absorption maximum in the visible and near infrared wavelength region of 600 to 1,200 nm and loses or diminishes its power to absorb visible or near infrared radiation in the aforesaid wavelength region upon exposure to ultraviolet radiation, X-rays, an electron beam or an ion beam, and irradiating desired locations of the recording layer with ultraviolet radiation, X-rays, an electron beam or ion beam to form a pattern based on the presence or absence, or variation in strength, of the power to absorb visible or near infrared radiation in the aforesaid wavelength region so as to record information in the recording layer; a method for reading optically recorded information which comprises illuminating a pattern formed as described above with laser light having a wavelength in the aforesaid visible and near infrared region and detecting the presence or absence, or variation in intensity, of absorption of the laser light to read the recorded information; and optical recording media for use in the above-described optical recording method.

12 Claims, 3 Drawing Figures

OPTICAL RECORDING METHOD AND MEDIA THEREFOR

This application is a continuation of application Ser. No. 553,466 filed Nov. 18, 1983, now abandoned.

BACKGROUND OF THE INVENTION (1) Field of the Invention:

This invention relates to a method for recording information optically, a method for reading the recorded information optically, and optical recording media for use in recording information optically and reading the recording information optically.

(2) Description of the Prior Art:

In recent years, it is more and more strongly desired to record information (for example, images or voices) and reproduce the recorded information at high speed, at high density and with ease. In fact, a variety of recording methods and recording media associated therewith have been proposed and some of them are being used for practical purposes.

Among these recording media, the so-called optical disks which typically use laser light for the purpose of reading recorded signals are expected to find general acceptance, because they can record information on the medium at an extremely high density and read the desired recorded information from any location on the medium.

Conventionally, typical recording and reading systems for use with optical disks are based on the method in which information is recorded by forming minute pits in a surface of light-transmissive plastic material and the recorded information is read by forming a reflective layer on the pit-bearing surface (e.g., by vacuum evaporation of metal), illuminating the medium with a spot beam of laser light, generally from the opposite side, and using a photodiode or the like to detect changes in the amount of reflected light due to the diffraction of light at the pit edges and convert them into electric signals.

However, since this method involves the creation of very minute, physical configurations having a dimension of 1 $\mu$m or less (i.e., pits) by physical means such as injection molding, compression molding or the like, a number of shortcomings are recognized with respect to recording accuracy and productivity. Specifically, the fabrication of a stamper used for the transfer of signal pits requires a highly complicated procedure and, moreover, the stamper has a limited working life because it tends to become clogged during repeated use for molding purposes. In addition, this method has the disadvantages of encountering difficulties in forming highly accurate pits under certain molding conditions, requiring an expensive molding machine, and imposing great restrictions on the molding properties of the plastic material used as a base material.

Accordingly, it is desired to develop a novel optical recording medium based on a new signal input/output principle which can overcome the above-described disadvantages.

SUMMARY OF THE INVENTION

It is an object of the present invention to provide an optical recording method for recording information at high density without forming physical signal pits involving many problems from the viewpoint of production technology.

It is another object of the present invention to provide a method for reading the recorded information by means of a visible or near infrared laser.

It is still another object of the present invention to provide optical recording media for use in the above-described optical recording method.

Other objects of the present invention will be apparent from the following description.

In the present invention, information is recorded and read by utilizing the functions of a special photosensitive layer, and not by forming signal pits through plastic molding.

DETAILED DESCRIPTION OF THE INVENTION

Figure 1:
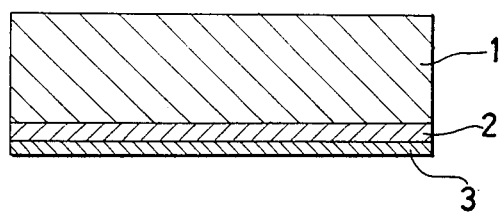
FIG. 1 is a vertical sectional view illustrating one embodiment of the optical recording medium of the present invention.

In the optical recording method of the present invention, there is used a recording layer containing a recording substance that has an absorption maximum in the visible and near infrared wavelength region of 600 to 1,200 nm and loses or diminishes its power to absorb visible or near infrared radiation in the aforesaid wavelength region upon exposure to ultraviolet radiation, X-rays, an electron beam or an ion beam. Information is recorded by irradiating desired locations of the recording layer with ultraviolet radiation, X-rays, an electron beam or an ion beam to form a substantially smooth and pitless pattern based on the presence or absence, or variation in strength, of the power to absorb visible or near infrared radiation in the aforesaid wavelength region. The information thus recorded can be read by illuminating the pattern of the recording layer with laser light having a wavelength in the aforesaid visible and near infrared region and detecting the presence or absence, or variation in intensity, of absorption of the laser light.

In the optical recording media of the present invention, the recording layer thereof contains a recording substance that has an absorption maximum in the visible and near infrared wavelength region of 600 to 1,200 nm and loses or diminishes its power to absorb visible or near infrared radiation in the aforesaid wavelength region upon exposure to ultraviolet radiation, X-rays, an electron beam or an ion beam. As will be discussed later, this recording layer may be formed in contact with a substrate or constituted by a substrate containing the recording substance.

More specifically, in sharp contrast to conventional optical recording media using as memory means minute indentations formed by injection molding or compression molding, the optical recording media of the present invention use as memory means a pattern based on the presence or absence, or variation in strength, of the power to absorb light in the wavelength region of 600 to 1,200 nm. This pattern is formed by the utilization of a recording substance having the property of losing or diminishing its power to absorb light in the aforesaid wavelength region upon exposure to ultraviolet radiation, X-rays, an electron beam or an ion beam (which will hereinafter be referred to as recording energy rays), and not by resorting to any mechanical means. Thus, the optical recording media of the present invention have an essentially smooth surface.

Typical examples of the recording substance used in the present invention include ultraviolet-sensitive organic dyestuffs as described hereinbelow. However, the present invention is not limited to these dyestuffs, but there may be used any substance that can perform the above-described functions. As for useful dyestuffs, they are broadly divided into 6 classes: aromatic diamine-metal complexes, aromatic dithiol-metal complexes, aliphatic dithiol-metal complexes, mercaptophenol-metal complexes, arylaminium salts and bis(diiminosuccinonitrilo) metal complexes. Further details of these compounds can be found, for example, in Japanese Patent Laid-Open Nos. 2833/'83, 105960/'83, 105996/'83 and 16888/'83, as well as Inorganic Chemistry, 14, 640–645(1975).

The aromatic diamine-metal complexes are compounds of the general formula

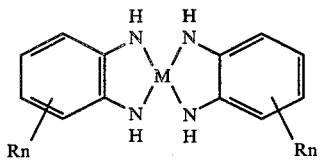

(I)

where R is a hydrogen atom, an alkyl group of 1 to 18 carbon atoms, a halogen atom or a nitro group, n is an integer of 1 to 4, and M is a nickel, cobalt, palladium or platinum atom. Among these compounds, bis(4-chloro-o-phenylenediamino)nickel [having a maximum absorption wavelength (hereinafter referred to as $\lambda_{max}$) of 800 nm and a molar specific extinction coefficient (hereinafter referred to as $\epsilon$) of 66,600] and bis(4-methyl-o-phenylenediamino)nickel ($\lambda_{max}$=795 nm, $\epsilon$=55,100) are particularly preferred because of their ease of synthesis and excellent compatibility with various types of resins which is a property useful for practical purposes.

The aromatic dithiol-metal complexes are compounds of the general formula

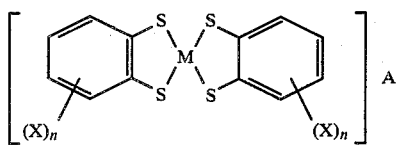

(II)

where X is a hydrogen atom, a chlorine atom, a bromine atom or a methyl group, n is an integer of 1 to 4, M is a nickel, cobalt, palladium or platinum atom, and A is a quaternary ammonium group. Among these compounds, bis(1-methyl-3,4-dithiophenolato)nickel(II) tetra-n-butylammonium ($\lambda_{max}$=912 nm, $\epsilon$=14,720), bis(1,2,3,4-tetrachloro-5,6-dithiophenolato)nickel(II) tetra-n-butylammonium ($\lambda$max=885 nm, $\epsilon$=15,700) and bis(1,2,4-trichloro-5,6-dithiophenolato)nickel(II) tetra-n-butylammonium ($\lambda_{max}$=870 nm, $\epsilon$=14,900) are particularly preferred because of their ease of synthesis and excellent compatibility with various types of resins.

The aliphatic dithiol-metal complexes are compounds of the general formula

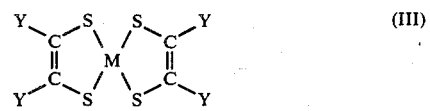

(III)

where Y is a methyl, phenyl or substituted phenyl group, and M is a nickel, cobalt, palladium or platinum atom. Among these compounds, bis[cis-1,2-bis(p-methoxyphenyl)-ethylene-1,2-dithiolato]nickel ($\lambda_{max}$=920 nm, $\epsilon$=35,000) and bis(cis-1,2-bis-phenylethylene-1,2-dithiolato)platinum ($\lambda_{max}$=800 nm, $\epsilon$=51,600) are particularly preferred because of their ease of synthesis and excellent compatibility with various types of resins.

The mercaptophenol-metal complexes are compounds of the general formulas

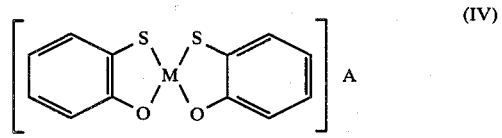

(IV)

and

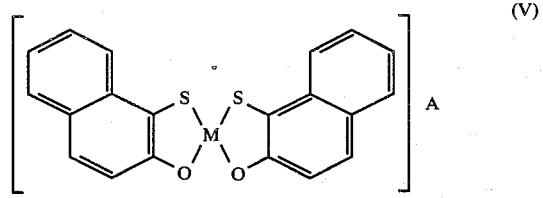

(V)

where M is a nickel, cobalt, palladium or platinum atom, and A is a quaternary ammonium group. Among these compounds, bis(1-mercaptolato-2-naphtholato)-nickel(II) tetra-n-butylammonium ($\lambda_{max}$=1,100 nm, $\epsilon$=12,290) and bis(1-thio-2-phenolato)nickel(II) tetra-n-butylammonium ($\lambda_{max}$=1,025 nm, $\epsilon$=12,700) are particularly preferred because of their ease of synthesis and excellent compatibility with various types of resins.

The arylaminium salts include a variety of well-known compounds. Among these compounds, p-methoxyphenylbis(diethylaminophenyl)aminium hexafluoroantimonate ($\lambda_{max}$=1,025 nm, $\epsilon$=26,800; $\lambda_{max}$=630 nm, $\epsilon$=5,200) and 4,4'-bis(methylaminophenyl)aminium iodide ($\lambda_{max}$=1,000 nm, $\epsilon$=32,890; $\lambda_{max}$=740 nm, $\epsilon$=12,880) are particularly preferred because of their ease of synthesis and excellent compatibility with various types of resins.

The bis(diiminosuccinonitrilo)metal complexes are compounds of the general formula

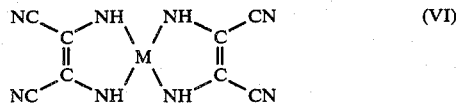

(VI)

where M is, for example, a nickel, palladium, platinum or cobalt atom. These compounds can be synthesized according to the procedure described in Inorganic Chemistry, 14, 640–645(1975). Typical examples thereof include bis(diiminosuccinonitrilo)nickel, bis(-diiminosuccinonitrilo)palladium, bis(diiminosuccinonitrilo)platinum and bis(diiminosuccinonitrilo)cobalt.

The above-enumerated compounds which are useful as the recording substance have an absorption maximum or maxima in the wavelength region of 600 to 1,200 nm, and lose or diminish their power to absorb light in the aforesaid wavelength region upon exposure to recording energy rays.

In the practice of the present invention, the type of recording substance used should preferably be selected according to the wavelength of the laser light used for reading the recorded information. More specifically, it is particularly preferable to use a recording substance having an absorption maximum at a wavelength approaching that of the laser light used for reading purposes.

Typically, the aforesaid recording substance, together with a resin binder having film-forming properties, is dissolved in an organic solvent and coated on a substrate. Then, the coated substrate is dried to remove the organic solvent and thereby form a recording substance containing layer. The thickness of the recording substance containing layer should be not greater than 10 μm and preferably not greater than 2 μm, from the viewpoint of recording density. Alternatively, aforesaid recording substance may also be used by incorporating it into a thermoplastic resin and forming the resulting mixture into a film or sheet so as to provide a substrate containing the recording substance. However, the recording substance containing substrate thus obtained is somewhat inferior in recording density because it is difficult to make a film or sheet of small thickness.

No particular limitation is placed on the type of the aforesaid resin binder having film-forming properties, so long as it is transparent and compatible with the recording substance. However, the resin binder is usually selected from methacrylate resins, methacrylic acid ester copolymer resins, polystyrene resins, styrene copolymer resins, vinyl chloride resins, polyester resins, polycarbonate resins, cellulose derivatives (such as cellulose acetate, cellulose butyrate, nitrocellulose, etc.), alkyd resins, polyurethane resins and the like. Where one of these resins is used as the resin binder, a recording substance containing layer can also be formed by adding a crosslinking agent to the resin binder, coating a substrate with a solution of the recording substance and the resin binder and then heating the coated substrate to dry the coating film and cure the resin binder thermally.

Specific examples of the aforesaid substrate for the recording substance containing layer include sheets or films of transparent plastic materials such as methacrylate resins (typified by polymethyl methacrylate), methacrylic acid ester copolymer resins, polycarbonate resins, vinyl chloride resins, styrene copolymer resins, polyester resins, acrylonitrile-styrene resins, cellulose acetate resins, etc.; transparent inorganic materials such as glass; metal sheets having a mirror surface; plastic or glass sheets metallized thereon; and the like. However, the use of a transparent substrate is preferable from the viewpoint of durability of the recording medium during its long-term use, because the recorded information can be read by illuminating the recording medium with a beam of laser light from the side opposite to the recording substance containing layer through the transparent substrate.

Then, the substrate (e.g., in disk form) having a recording substance contained layer formed as above is irradiated with recording energy rays which are usually directed through a photomask having a desired pattern, so that a pattern based on the presence or absence, or variation in strength, of the power to absorb light in the wavelength region of 600 to 1,200 nm is formed in the recording substance containing layer. Alternatively, a pattern can also be formed by scanning the recording medium with a spot beam of recording energy rays through movement of the beam and/or the recording medium. However, if it is desired to make a large number of identical records, recording media are preferably irradiated with recording energy rays directed through a photomask.

Among various types of recording energy rays, ultraviolet radiation is most preferred because of the simplicity of apparatus for producing it. It is preferable to use ultraviolet radiation generally having a wavelength of not higher than 450 nm, the more preferred range being from 160 to 400 nm. As the apparatus for producing ultraviolet radiation, there may usually be used a light source selected from a mercury vapor lamp, a high pressure mercury vapor lamp, a xenon arc lamp, a xenon flash lamp, a mercury-xenon arc lamp, a deuterium lamp, ultraviolet lasers (such as an argon laser, helium-cadmium laser, dyestuff laser, excimer laser, etc.) and the like.

Apparatus for producing X-rays, an electron beam or an ion beam are expensive and complicated, as compared with those for producing ultraviolet radiation. However, they are useful for the purpose of forming more minute patterns.

As the photomask, there may be used any photomask that creates a distinct difference between the exposed and the unexposed part according to the type of recording energy rays used. Generally, the photomask is fabricated similarly to those used for semiconductor processing purposes. Typically, it comprises a substrate made of glass (e.g., soda-lime glass, white crown glass, aluminoborosilicate glass, quartz glass or the like) and a layer of nontransmissive material (e.g., silver emulsion, chromium, chromium-chromium oxide, nickel, iron oxide or the like) deposited thereon.

The recording substance containing layer may be exposed according to any of various methods in which the photomask is disposed in direct contact with the disk, the photomask is disposed in proximity to the disk, the pattern of the photomask is projected on the disk at equal magnifications, or the light transmitted by the photomask is diverged or converged by means of a lens.

As a result of the exposure to recording energy rays, only the exposed part of the recording substance containing layer is reduced in the power to absorb laser light used for reading purposes and the signals are recorded thereby. It is desirable that the absorption of the laser light in the exposed part is not greater than 80%, preferably not greater than 60%, of that in the unexposed part. Within this range, the signal-to-noise ratio is desirably improved as the absorption in the exposed part decreases.

The exposure conditions which create the abovedescribed desirable difference in light absorption between the unexposed and the exposed part depend on the type of recording energy rays used, the type of recording substance used, the distance from the recording energy ray source, and the like. However, it is common practice to select such exposure conditions as provide an amount of energy of not less than 100 mJ/cm$^2$ and preferably not less than 200 mJ/cm$^2$.

The pattern thus obtained is illuminated with reading rays comprising laser light having a wavelength of 600 to 1,200 nm. This laser light is focused by means of a lens and directed to the pattern in the form of a spot beam usually having a diameter of 2 μm or less. In this way, the recorded information can be read by detecting differences in transmittance or reflectance of the laser light resulting from the presence or absence, or variation in intensity, of absorption of the laser light. The resulting changes in the amount of transmitted or reflected laser light are detected with a photo detector and converted into electrical signals which are then used in the reproduction of voices or images or fed to a computer.

Figure 2:
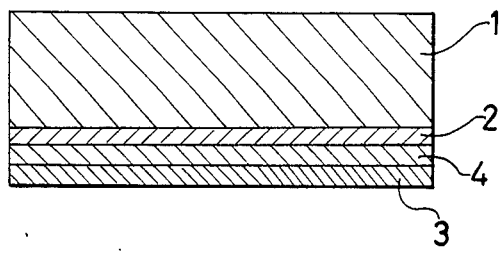
FIG. 2 is a vertical sectional view illustrating another embodiment of the optical recording medium of the present invention.
Figure 3:
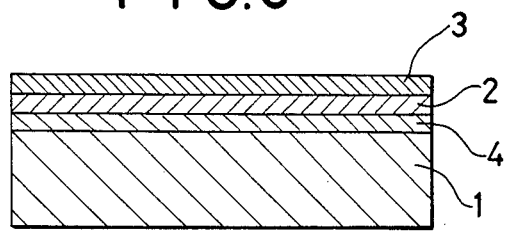
FIG. 3 is a vertical sectional view illustrating still another embodiment of the optical recording medium of the present invention.

The laser light source for the supply of reading rays is selected from lasers having an oscillation wavelength approaching as near to the maximum absorption wavelength of the recording substance as possible. Useful laser light sources include, for example, various types of semiconductor lasers (such as an aluminum-gallium-phosphorus semiconductor laser, aluminum-gallium-indium semiconductor laser, gallium-arsenic laser, aluminum-gallium-arsenic semiconductor laser, aluminum-gallium-indium-phosphorus semiconductor laser, etc.), a helium-neon laser, a YAG-Nd laser and the like. However, these examples are not limitative and there may be used any laser that produces light exhibiting good focusability and has an oscillation wavelength in the region of 600 to 1,200 nm.

Where the recorded information is read by detecting changes in the amount of transmitted laser light, a photo detector is disposed on the side opposite to the light source. Accordingly, the substrate 1 shown in FIG. 1 must be transparent. If desired, in order to protect the recording layer 2 formed on the upper or under side of the substrate, a protective layer 3 may be formed by coating the recording layer with an organic resin or by bonding a transparent film or sheet to the recording layer. In this case, the optical recording medium may be illuminated with laser light either from the substrate side or from the recording layer side.

Where the recorded signals are read by detecting changes in the amount of reflected light, a recording layer 2 is formed on the upper or under side of the subtrate 1 shown in FIG. 2 and information is written to the recording layer in the above-described manner. Thereafter, a reflective layer 4 is formed in contact with the recording layer, for example, by vacuum evaporation of metal. It is to be understood that a protective layer 3 may be formed in contact with the reflective layer 4 in the same manner as described above. Alternatively, as illustrated in FIG. 3, there may be used a substrate 1 comprising a metal sheet having a mirror surface as the reflective layer 4 or a film or sheet having a layer of evaporated metal as the reflective layer 4. In this case, a recording layer 2 is formed in contact with the reflective layer 4 and signals are written to the recording layer. Again, a protective layer 3 may be formed in contact with the recording layer 2. Where the recorded signals are read by the detection of reflectance, two recording sheets or films may be laminated to form a double-sided disk.

As described above, the present invention provides a novel optical recording method, a novel method for reading optically recorded information, and novel optical recording media, which are characterized by avoiding the formation of physical signal pits involving many problems from the viewpoint of production technology and are particularly useful in duplicating a large number of identical records.

The present invention is more specifically illustrated by the following examples. However, these examples are intended to facilitate the understanding of the invention and are not to construed to limit the scope of the invention.

EXAMPLE 1

Ten parts of bis(1,2,3,4-tetrachloro-5,6-ditiophenolato)nickle(II) tetra-n-butylammonium ($\lambda_{max}=885$ nm) and 100 parts of a methyl methacrylate/n-butyl methacrylate copolymer resin were dissolved in a mixed solvent consisting of 100 parts of dichloromethane and 100 parts of methyl ethyl ketone. This solution was spin coated on one side of a methacrylate resin disk 1.2 mm in thickness so as to give a dry film thickness of 1.5 μm, and then dried at 80° C. for 30 minutes to remove the solvent. Subsequently, a photomask comprising a plate of soda-lime glass having a nontransmissive layer of chromium deposited thereon and representing image signals was brought into direct contact with the coated side. Then, using a high pressure mercury vapor lamp having a power output of 3 kW, the signals were written by irradiating the assembly with ultraviolet radiation to an exposure of 600 mJ/cm$^2$ and thereby transferring the pattern of the photomask to the recording substance containing layer. Thus, there was obtained an optical disk constituting an optical recording medium of the present invention.

The above optical disk was illuminated, from its coated side, with a spot beam of light produced by an aluminum-gallium-arsenic semiconductor laser (oscillation wavelength 830 nm) and focused so as to have a diameter of about 1 μm in the recording substance containing layer. While the disk was being rotated at a constant speed, changes in the amount of transmitted laser light were detected by means of a photodiode disposed on the opposite side of the disk and converted into electric signals which were then used in an attempt to reproduce the original image. As a result, an image of very high quality could be obtained.

EXAMPLE 2

A reflective layer having a thickness of about 600 angstroms was formed by evaporating aluminum onto the signal-recorded side of the optical disk obtained in Example 1. Then, the reflective layer was protected by coating it with an acrylic lacquer composition. Thus, there was obtained an optical disk of the reflection type in accordance with the present invention.

The above optical disk was illuminated, from its nonreflective or methacrylate resin substrate side, with a spot beam of light produced by an aluminum-gallium-arsenic semiconductor laser (oscillation wavelength 830 nm) and focused so as to have a diameter of about 1 μm in the recording substance containing layer. While the disk was being rotated at a constant speed, changes in the amount of reflected laser light were detected by means of a photodiode and converted into electric signals which were then used in an attempt to reproduce the original image. As a result, an image of very high quality could be obtained.

EXAMPLE 3

The procedure of Example 1 was repeated except that bis(4-methyl-o-phenylenediamino)nickel ($\lambda_{max}=795$ nm, $\epsilon=55,100$) was used in place of the bis(1,2,3,4-tetrachloro5,6-dithiophenolato)nickel(II) tetra-n-butylammonium. Thus, there was obtained an optical disk of the transmission type in accordance with the present invention.

The above optical disk was illuminated, from its coated side, with a spot beam of light produced by a gallium-arsenic semiconductor laser (oscillation wavelength 780 nm) and focused so as to have a diameter of about 1 μm in the recording substance containing layer. While the disk was being rotated at a constant speed, changes in the amount of transmitted laser light were detected by means of a photodiode disposed on the opposite side of the disk and converted into electric signals which were then used in an attempt to reproduce the original image. As a result, an image of very high quality could be obtained.

EXAMPLE 4

The procedure of Example 1 was repeated except that bis(cis-1,2-bisphenylethylene-1,2-dithiolato)-platinum ($\lambda_{max}$=800 nm, $\epsilon$=51,600) was used in place of the bis(1,2,3,4-tetrachloro-5,6-dithiophenolato)nickel(II) tetra-n-butylammonium. After signals were written in the same manner as in Example 1, a reflective layer was formed in the same manner as in Example 2. Thus, there was obtained an optical disk of the reflection type. According to the procedure of Example 2, changes in the amount of reflected laser light was detected and converted into electric signals which were then used in an attempt to reproduce the original image. As a result, an image of very high quality could be obtained.

EXAMPLE 5

Ten parts of bis(1-mercaptolato-2-naphthalato)nickel(II) tetra-n-butylammonium ($\lambda_{max}$=1,100 nm) and 100 parts of a polymethyl methacrylate resin were dissolved in a mixed solvent consisting of 500 parts of dichloromethane and 500 parts of methyl ethyl ketone. This solution was spin coated on one side of a circular polyethylene terephthalate film 120 mm in diameter and 100 μm in thickness to form a recording substance containing layer having a thickness of 1.0 μm. Then, signals were written in the same manner as in Example 1, except that the exposure was 900 mJ/cm$^2$.

Thereafter, a reflective layer having a thickness of about 600 angstroms was formed by evaporating aluminum onto the signal-recorded side of the optical disk thus obtained. This optical disk was illuminated with a spot beam of light produced by a continuous oscillation type YAG laser (oscillation wavelength 1,060 nm) and focused so as to have a diameter of about 1 μm in the recording substance containing layer. While the disk was being rotated at a constant speed, changes in the amount of reflected laser light were detected and converted into electric signals which were then used in an attempt to reproduce the original image. As a result, an image of very high quality could be obtained.

EXAMPLE 6

Ten parts by weight of bis(diiminosuccinonitrilo)-nickel ($\lambda_{max}$=670 nm) and 100 parts by weight of a methyl methacrylate/n-butyl methacrylate copolymer resin were dissolved in a mixed solvent consisting of 100 parts by weight of dichloromethane and 100 parts by weight of methyl ethyl ketone. This solution was spin coated on one side of a methacrylate resin disk 1.2 mm in thickness so as to give a dry film thickness of 1.5 μm, and then dried at 80° C. for 30 minutes to remove the solvent. Then, signals were written in the same manner as in Example 1, except that the exposure was 400 mJ/cm$^2$.

Thereafter, a reflective layer having a thickness of about 600 angstroms was formed by evaporating aluminum onto the signal-recorded side of the optical disk thus obtained. This optical disk was illuminated with a spot beam of light produced by a helium-neon laser (oscillation wavelength 633 nm) and focused so as to have a diameter of about 1 μm in the recording substance containing layer. Changes in the amount of reflected laser light were detected and converted into electric signals which were then used in an attempt to reproduce the original image. As a result, an image of very high quality could be obtained.

EXAMPLE 7

The procedure of Example 6 was repeated except that p-methoxyphenylbis(diethylaminophenyl)aminium hexafluoroantimonate ($\lambda_{max}$=630 nm, $\epsilon$=5,200) was used in place of the bis(diiminosuccinonitrilo)nickel. Thus, there was obtained an optical disk of the reflection type. When this disk was evaluated in the same manner as in Example 6, an image of high quality could be obtained.

EXAMPLE 8

The procedure of Example 6 was repeated except that bis(diiminosuccinonitrilo)platinum ($\lambda_{max}$=638 nm, $\epsilon$=61,300) was used in place of the bis(diiminosuccinonitrilo)nickel. Thus, there was obtained an optical disk of the reflection type. When this disk was evaluated in the same manner as in Example 6, an image of high quality could be obtained.

EXAMPLE 9

A recording substance containing layer was formed on a methacrylate resin disk in the same manner as in Example 6. Then, using an electron beam lithographic apparatus for the fabrication of high-density integrated circuits, signals were directly written by scanning the recording substance containing layer in concentric circles with a pulsed electron beam of 1 μm diameter. After a reflective layer was formed in the same manner as in Example 6, the resulting optical disk was illuminated with a spot beam of light produced by a helium-neon laser. By detecting changes in the amount of reflected light, it was confirmed that the signals had been recorded distinctly.

EXAMPLE 10

A recording substance containing layer was formed on a methacrylate resin disk in the same manner as in Example 1. After a photomask comprising a chromium foil having holes of 1 μm diameter arranged in concentric circles was brought into direct contact with the recording substance containing layer, signals were written by irradiating the assembly with X-rays from an X-ray tube having an aluminum target to an exposure of 250 mJ/cm$^2$. Thereafter, according to the procedure of Example 1, the resulting optical disk was illuminated with a spot beam of light produced by a semiconductor laser. By detecting changes in the amount of transmitted light, it was confirmed that the signals had been recorded distinctly.

EXAMPLE 11

Signals were written to a optical disk in the same manner as in Example 1 and a protective layer comprising a polyester film of 25 μm thickness was bonded to the optical disk. When this optical disk was evaluated in the same manner as in Example 1, an image of high quality could be obtained similarly to Example 1.

EXAMPLE 12

The procedure of Example 6 was repeated except that a polyester film disk of 100 μm thickness having aluminum evaporated thereon to a thickness of 800 angstroms was used in place of the methacrylate resin disk and a recording substance containing layer was formed on the evaporated side by the same spin coating process. Then, signals were written in the same manner as in Example 6. Further, a protective film having a thickness of about 3 μm was formed by spin coating a 25 wt. % n-heptane/butanol solution of an isobutyl methacrylate polymer on the recording substance containing layer and drying it at 80° C. for 30 minutes. Thereafter, according to the procedure of Example 1, the resulting optical disk was illuminated with a spot beam of light produced by a helium-neon laser. Changes in the amount of reflected light were detected and converted into electric signals which were then used in an attempt to reproduce the original image. As a result, an image of high quality could be obtained.

EXAMPLE 13

Using an extruding machine, 0.5 part by weight of bis(1,2,3,4-tetrachloro-5,6-dithiophenolato)nickel(II) tetra-n-butylammonium ($\lambda_{max}$=885 nm) was incorporated into 100 parts by weight of a methacrylate resin of injection molding grade and the resulting mixture was pelletized. These pellets were injection molded to form a recording substance containing sheet in the form of a disk having a thickness of 1.2 mm.

Then, according to the procedure of Example 1, an optical recording medium of the present invention was obtained by bringing a photomask into direct contact with the recording substance containing sheet, irradiating the assembly with ultraviolet radiation from a high pressure mercury vapor lamp and thereby transferring the pattern of the photomask to the recording substance containing sheet.

This optical recording medium was illuminated with a spot beam of light produced by an aluminum-gallium-arsenic semiconductor laser in the same manner as in Example 1. As a result, the original signals could be reproduced by detecting changes in the amount of transmitted light.

EXAMPLE 14

A reflective layer having a thickness of 800 angstroms was formed by vacuum evaporating aluminum onto one side of a recording substance containing sheet obtained in the same manner as in Example 13. The resulting optical recording medium was illuminated with a spot beam of light produced by an aluminum-gallium-arsenic semiconductor laser in the same manner as in Example 1. As a result, the original signals could be reproduced by detecting changes in the amount of transmitted light.

What is claimed is:

1. A method for reading optically recorded information which comprises: (a) providing a recording layer containing a recording substance selected from the group consisting of aromatic diamino-metal complexes, aromatic dithiol-metal complexes, aliphatic dithiol-metal complexes, mercaptophenol-metal complexes, arylaminium salts and bis (diiminosuccinonitrilo)-metal complexes, which substance has an absorption maximum in the visible and near infrared wavelength region of 600 to 1200 nm and loses or diminishes its power to absorb visible or near infrared radiation in said wavelength region upon exposure to ultraviolet radiation, X-rays, and electron beam or an ion beam; (b) irradiating diesired locations of said recording layer with ultraviolet radiation having a wavelength substantially not greater than 450 nm to form a substantially smooth and pitless pattern based on the presence pr absence or variation in strength of the power to absorb visible or near infrared radiation in said wavelength region thereby recording information in said recording layer; (c) illuminating said pattern with laser light having a wavelength in said visible or near infrared region and (d) detecting the presence or absence or variation in intensity of absorption of said laser light to read the recorded information.

2. A method as claimed in claim 1 wherein said aromatic diamine-metal complex is selected from compounds of the general formula

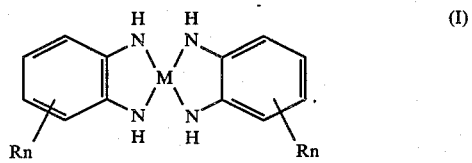

where R is a hydrogen atom, an alkyl group of 1 to 18 carbon atoms, a halogen atom or a nitro group, n is an integer of 1 to 4, and M is a nickel, cobalt, palladium or platinum atom.

3. A method as claimed in claim 1 wherein said aromatic dithiol-metal complex is selected from compounds of the general formula

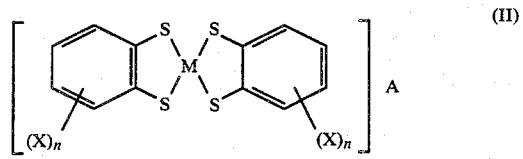

where X is a hydrogen atom, a chlorine atom, a bromine atom, or a methyl group, n is an integer of 1 to 4, M is a nickel, cobalt, palladium or platinum atom, and A is a quaternary ammonium group.

4. A method as claimed in claim 1 wherein said aliphatic dithiol-metal complex is selected from compounds of the general formula

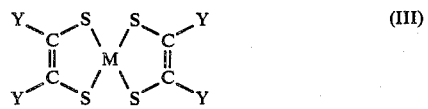

where Y is a methyl, phenyl or substituted phenyl group, and M is a nickel, cobalt, palladium or platinum atom.

5. A method as claimed in claim 1 wherein said mercaptophenol-metal complex is selected from compounds of the general formulas

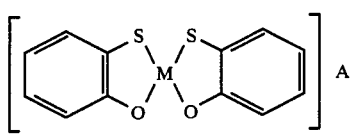
(IV)

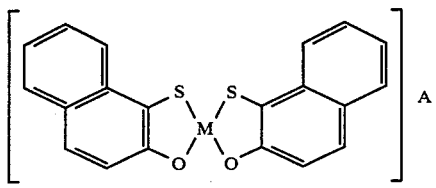
(V)

where M is a nickel, cobalt, palladium or platinum atom, and A is a quaternary ammonium group.

6. A method as claimed in claim 1 wherein said arylaminium salt is selected from p-methoxyphenylbis(-diethylaminophenyl)aminium hexafluoroantimonate and 4,4'-bis(methylaminophenyl)aminium iodide.

7. A method as claimed in claim 1 wherein said bis(-diiminosuccinonitrilo)metal complex is selected from compounds of the general formula

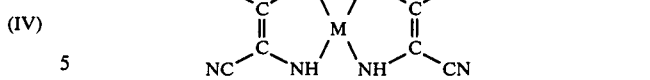
(VI)

where M is a nickel, palladium, platinum or cobalt atom.

8. A method as claimed in claim 2 wherein said aromatic diamine-metal complex is bis(4-chloro-o-phenylenediamino)nickel or bis(4-methyl-o-phenylenediamino)nickel.

9. A method as claimed in claim 3 wherein said aromatic dithiol-metal complex is bis(1-methyl-3,4-dithiophenolato)nickel(II) tetra-n-butylammonium, bis(1,2,3,4-tetrachloro-5,6-dithiophenolato)nickel(II) tetra-n-butylammonium or bis(1,2,4-trichloro-5,6-dithophenolato)nickel(II) tetra-n-butylammonium.

10. A method as claimed in claim 4 wherein said aliphatic dithiol-metal complex is bis[cis-1,2-bis(p-methoxyphenyl)ethylene-1,2-dithiolato]nickel or bis(-cis1,2-bisphenylethylene-1,2-dithiolato)platinum.

11. A method as claimed in claim 5 wherein said mercaptophenolmetal c®mplex is bis(1-mercaptolato-2naphthalato)nickel(II) tetra-n-butylammonium or bis(1-thio-2-phenolato)nickel(II) tetra-n-butylammonium.

12. A method as claimed in claim 7 wherein said bis(diiminosuccinonitrilo) metal complex is bis(-diiminosuccinonitrilo)nickel, bis(diiminosuccinonitrilo)palladium, bis(diiminosuccinonitrilo)platinum or bis(diiminosuccino-nitrilo)cobalt.

* * * * *